United States Patent
Joly

(10) Patent No.: US 8,498,466 B2
(45) Date of Patent: Jul. 30, 2013

(54) METHOD OF EVALUATION BY COMPARISON OF AN ACQUIRED IMAGE WITH A REFERENCE IMAGE

(75) Inventor: Alexandre Joly, Cournon d'Auvergne (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 528 days.

(21) Appl. No.: 12/809,596

(22) PCT Filed: Dec. 16, 2008

(86) PCT No.: PCT/EP2008/067651
§ 371 (c)(1),
(2), (4) Date: Sep. 30, 2010

(87) PCT Pub. No.: WO2009/077537
PCT Pub. Date: Jun. 25, 2009

(65) Prior Publication Data
US 2011/0013823 A1 Jan. 20, 2011

(30) Foreign Application Priority Data
Dec. 19, 2007 (FR) ...................................... 07 60051

(51) Int. Cl.
*G06K 9/00* (2006.01)
(52) U.S. Cl.
USPC .......................................................... 382/141

(58) Field of Classification Search
USPC .................................................. 382/141, 152
See application file for complete search history.

(56) References Cited

U.S. PATENT DOCUMENTS

| | | | | |
|---|---|---|---|---|
| 4,111,557 A | * | 9/1978 | Rottenkolber et al. | 356/394 |
| 5,146,228 A | | 9/1992 | Irani et al. | |
| 6,092,414 A | * | 7/2000 | Newman | 73/146 |
| 2005/0058333 A1 | * | 3/2005 | Kaneko et al. | 382/141 |
| 2007/0209431 A1 | * | 9/2007 | Fujisawa et al. | 73/146 |

FOREIGN PATENT DOCUMENTS

| | | |
|---|---|---|
| EP | 1 477 765 | 11/2004 |
| EP | 1 480 469 | 11/2004 |
| JP | 11 203450 | 7/1999 |

* cited by examiner

*Primary Examiner* — Edward Park
(74) *Attorney, Agent, or Firm* — Cozen O'Connor

(57) ABSTRACT

A method for evaluating the surfaces of a tire, said surfaces being molded with rigid elements, wherein a collection of N images of a given zone of the tire is constituted based on the images originating from one or more tires, each of the images of the collection being constituted by the values of physical magnitudes measured by a sensor sensitive to the reflection of the light at each of the points with coordinates i, j of said surface, and then the images of said collection are made to correspond by superposition, and the image of the zone of a tire from said collection to be evaluated is compared with a reference image. The value of the physical magnitudes of the reference image is calculated based on the value of each of these physical magnitudes measured on the N images of said collection.

10 Claims, 2 Drawing Sheets

METHOD OF EVALUATION BY COMPARISON OF AN ACQUIRED IMAGE WITH A REFERENCE IMAGE

RELATED APPLICATIONS

This is a U.S. national stage under 35 USC §371 of application No. PCT/EP2008/067651, filed on Dec. 16, 2008.

This application claims the priority of French application no. 07/60051 filed Dec. 19, 2007, the entire content of which is hereby incorporated by reference.

FIELD OF THE INVENTION

The invention relates to the field of visual inspection of objects, wherein one seeks to compare the image of a given object with one or more reference images of this same object.

BACKGROUND OF THE INVENTION

More particularly, the invention relates to the field of visual inspection of tires in which the image of a tire to be inspected is compared with a reference image of this tire. The comparison of these two images makes it possible, by analysis of the differences, to determine, at a given point on the image, the variations in the value of a physical magnitude assigned to this point and originating from a generally digital image sensor. The physical magnitudes measured by the sensor may relate to the color, to the brightness, to the texture of the object observed or else to the height of the points relative to a reference surface, when equipment capable of creating a three-dimensional image is used.

These variations are analyzed with the aid of algorithms adapted to determine the degree of conformity of the tire to be evaluated, and to decide whether this tire can be considered to be compliant or whether it must be directed toward a treatment center.

One of the difficulties to be overcome for carrying out this type of inspection consists in having an image that is as close as possible to the "ideal" model of the type of tire to be inspected while taking account of the variability of acquisition.

This ideal model may originate for example from the digital image used in the design of the tire or in the production of the mold, but it then becomes difficult to integrate the shadow zones associated with the nature and with the position of the lighting elements, to take account of the presence and the shape of elements such as the teats formed by the vents, or to retrieve, by calculation, the variations in the values originating from the physical magnitudes measured, and associated with the nature of the generally black rubber materials, as a function of the chosen lighting angles, or else of the calibration of the sensors.

Another possibility consists in taking as a reference the image of a tire that is real and considered to be "ideal". In this case also, it is necessary to overcome other difficulties, such as the variation in brightness or in texture of the surface to be evaluated, the evolution of which is associated with the surface state of the mold, but also, the reproducibility of the lighting elements between the images or else the differences in positioning of the tire between the production of the two images.

SUMMARY OF THE INVENTION

Beginning with the idea that one and the same anomaly is not systematically repeated at the same place on several images in sequence, one object of the invention is to consider that the "ideal" image, or the reference image, of a given zone of the tire can be obtained by producing the "mean" of a certain number of images of the same zone or of one and the same basic pattern of the tire, this collection of images being able to be acquired on one or more images of one or more tires.

Specifically, the tires originating from one and the same mold are, if not identical, sufficiently similar to one another for it to be possible, at a given point of the image, to calculate a "mean" value of the signal that originates from the image sensor, and that will give the image called the reference image.

This technique requires that, between two images, the variations in position of a characteristic point of the tire are not too great. It is therefore particularly well suited to surfaces molded with rigid elements such as the surfaces situated in the outer zones of the tire such as the tread, the zone of the sidewalls or of the shoulders, or else the bottom zone, and which are usually obtained by molding on rigid portions of mold. The flexible membrane, usually used for molding the inner portion, does not make it possible to position the molding patterns in a sufficiently reproducible manner. However, it would be possible to envisage the use of the technique according to the invention when the molding of the inner portion is carried out with a rigid core.

A method according to an embodiment of the invention carries out the acquisition of N images of one and the same zone of one or more tires to be examined, in having made to correspond with one another the N images acquired so as to form a collection of images, and in calculating the reference image based on the collection of images obtained previously.

What is meant by image is the information originating from one or more sensors sensitive to reflected light at a given point by the tire to be examined. This image may be two- or three-dimensional, with gray level, monochrome or in color. It may originate from a linear camera, a matrix camera with gray level or in color or else from laser triangulation sensors, etc.

Each pixel of the image is associated with the value at this point of a certain number of physical magnitudes measured at this point by the sensor(s), such as the height relative to a reference surface, the brightness, the texture, the gray level or the color level.

An image therefore takes the form of as many data tables as measured physical magnitudes. Each of the tables containing for a given magnitude the values of this physical magnitude for a point with coordinates i, j.

It is then sufficient to compare the image of the tire to be examined with the reference image obtained according to the above method, in order to determine the zones of the tire comprising an anomaly. The tire to be examined may or may not, without distinction, originate from the collection of images that was used to calculate the reference image.

The comparison is carried out by superposing the image to be evaluated on the reference image, and, for a given point of the image, finding the difference between the values of the physical magnitudes of the reference image and the values of these same physical magnitudes measured on the tire to be evaluated. The algorithms relating to the detection of anomaly thresholds are not the subject of the present invention.

One particular embodiment of the invention relates to the tread which has molding patterns formed by the assembly of basic patterns, few in number, juxtaposed circumferentially and sequenced in a precise and determined manner.

The basic patterns of the sculpture have similar shapes and have dimensions that are similar but not fully identical. Each type of basic pattern therefore appears several times on the circumference of the sculpture of the cover. The choice of the dimensions and the arrangement of the basic patterns are carried out in a manner that is judicious and known to those skilled in the art, for the purpose of reducing the rolling vibrations or noises.

The reference image then consists only of the reference images of the basic patterns which it is then sufficient to compare with the image of the real basic patterns placed on the circumference of the tire, after having identified and located them.

Moreover, it is sufficient to acquire the image of the tread of a single tire in order to obtain a sufficient collection of images of each of the basic patterns, and to calculate the reference images of these basic patterns with which each of the images of the real basic patterns of the tires to be evaluated will be compared.

It will be observed that this tire may preferably be the tire from which said collection of images that was used to calculate the reference images of the basic patterns originates. Therefore the reference used for evaluating a tire originates from the tire to be evaluated itself. In this manner, the difficulties mentioned in the previous paragraphs and relating to the variability of the measurement conditions are greatly reduced.

DETAILED DESCRIPTION OF THE DRAWINGS

Figure 1:
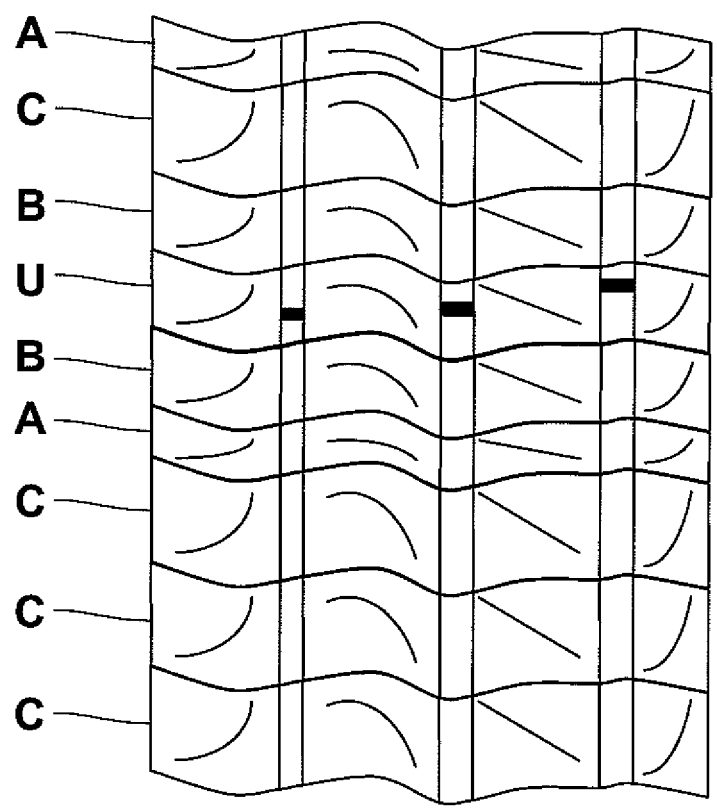
FIG. 1 represents a schematic view of a portion of tread.
Figure 2:
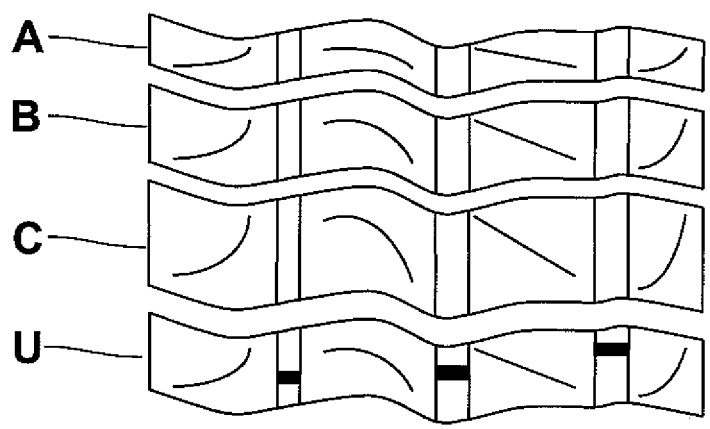
FIG. 2 represents a schematic view of 4 types of basic pattern used for producing the sculpture of the tread.

FIG. 1 shows a portion of tire tread on which the presence of several types of basic pattern are observed, marked respectively A, B, C and U. These types of basic pattern are represented individually in FIG. 2 and comprise for example three patterns A, B and C of different lengths and a pattern U containing the tread-wear indicators. These four types of basic pattern will be repeated in a precise sequence all round the circumference of the tire.

Therefore, the sequence of the tread portion illustrated in FIG. 1 is a sequence marked ACBUBACCC. And, for a given dimension of this tire range, the final sequence will be formed by the juxtaposition of these four types of basic pattern arranged in a complex and known sequence, beginning with ACBUBACCC and continuing for example with the patterns BCAABUAABCBCBAAABBUCACAACBAACBBAU, etc.

One dimension may comprise, as a general rule, from one to five basic patterns, and a tread comprises, depending on the diameters, the repetition of eighty to a hundred and fifty basic patterns, arranged in the desired sequence. The result of this is that a given type of basic pattern, for example the basic pattern A, will be used, depending on the dimensions and the type of sculpture, between ten and forty times per tread.

The shape of the transverse boundaries of each of the types of basic pattern is adapted to be able to indistinctly follow the transverse boundary of any basic pattern of another type.

The basic pattern shown in the figure occupies the whole transverse width of the tread. This arrangement is not limiting and the principles of the invention may extend to the situation in which the sculpture comprises several different basic patterns placed on one and the same transversal. This is the case in particular with sculptures called asymmetric sculptures.

The acquisition of the image of the tread (or of the sidewall, of the shoulder zone or of the bottom zone) can be carried out in a known manner by using for example a linear camera or any other image-acquisition means. Preferably, a digital acquisition means will be chosen that makes it possible to obtain one or more digital values for each of the characteristic physical magnitudes. Each pixel is also allocated coordinates in a usually two-dimensional reference system. The height information, relative to the patterns of sculpture or to the engravings of the sidewalls, is information associated with a physical magnitude and determined by known means, with reference to a surface considered to be the basic surface.

One the image has been acquired, the sequence and the position of the basic patterns defining the sculpture should be found and these patterns should be delimited in order to isolate them and group them by type.

To carry out this operation, it is necessary to have, as input data, models of basic patterns. The models may be relatively brief, because the data used serve only to identify the basic patterns of the acquired image so as to classify them in the category of pattern that corresponds thereto. These models are, as a general rule, different from the reference images although they may be deduced therefrom.

The models may originate, for example, from the acquisition of an initial image in gray level on which the basic patterns will have been previously identified. The identification of the basic pattern on the acquired image is then carried out by searching for the best correlation between the acquired image and the image of the various basic patterns originating from the initial image. The correlation analysis techniques are known per se and require the searching for a maximum per zone, and the use of a filter of determined size order and corresponding substantially to the size of a basic pattern.

These models may also originate from the drawing of the outer contours used to represent the sculpture or else from the design data of the tire or of the mold. It is then sufficient to transform the image acquired of the tread so as to show only the contours, by filtering the data with the aid of known algorithms such as for example an algorithm of the Canny-Deriche type and suitable for processing a 2D image. Then, the best correlation between the contours of the basic patterns originating from the image used as a model and the contours of the acquired image must be found. In particular, it may be necessary to adapt the image used as a model in order to take account of the fact that the acquired image is obtained on a tire that is likely to sustain deformations during the cooling phase.

In this respect, it will be noted that the contour of each of the patterns may differ from the theoretical model used to determine the family of basic patterns to which this pattern belongs. Similarly, the contours of the images acquired of the various patterns of one and the same family, for example the patterns of type A, may sustain differences relative to one another. These differences are due in large part to the manner in which the sculpture elements are mechanically installed in the mold and to the elastic deformations sustained by the crown when the tire is pressurized.

Consequently, it may be worthwhile to readjust the images of one and the same type of basic pattern, so that patterns, characteristic points such as the tread-wear indicators, contour elements, or zone boundaries, previously identified, are superposed as well as possible. This readjustment is carried out by local deformation in order to make these patterns, these characteristic points, these contour elements or these zone boundaries correspond.

Once this information is obtained, a division by zones of the acquired image is obtained, each of the zones corresponding to one basic pattern. It is then possible to establish the sequence of these patterns over the length of the circumference and it may be wise, for a first plausibility check, to compare this sequence with the known sequence of the dimension.

It can also be envisaged to use the known sequence of the basic patterns in order to locate and identify each of the basic patterns of the acquired image.

All these methods have the object of determining the location of the basic patterns on the acquired image of the tread in order to identify them, isolate them, in order to form a collection of images of this basic pattern which will be used to calculate the "reference" image.

In the case of the sidewall, it is not necessary to find basic patterns. Also the collection of images is formed by the images of the sidewalls of N tires that are different and were acquired previously. It is nevertheless necessary to superpose as well as possible the N images by using the correlation calculation methods set out in the previous paragraphs. This "readjustment" of the images relative to one another may be carried out easily by turning the image to be readjusted around the center of rotation corresponding to the projection of the axis of rotation of the tire in the plane of the image and by finding the best correlation relative to a model image. For this purpose, and for the purpose of simplifying the calculations, it may be worthwhile to use patterns characteristic of the sidewall zone in order to carry out this superposition.

Said model image, as in the case of the tread, should preferably be a first image in gray level acquired previously or else a digital image of the engraving plane of the mold which then requires doing the correction calculations associated with the projection of the sidewalls on a plane and extracting, with the aid of the method cited above, the significant contours of the acquired image of the sidewall. Additionally, it is also possible to find significant patterns and to deform the image so as to place these patterns in correspondence.

Figure 3:
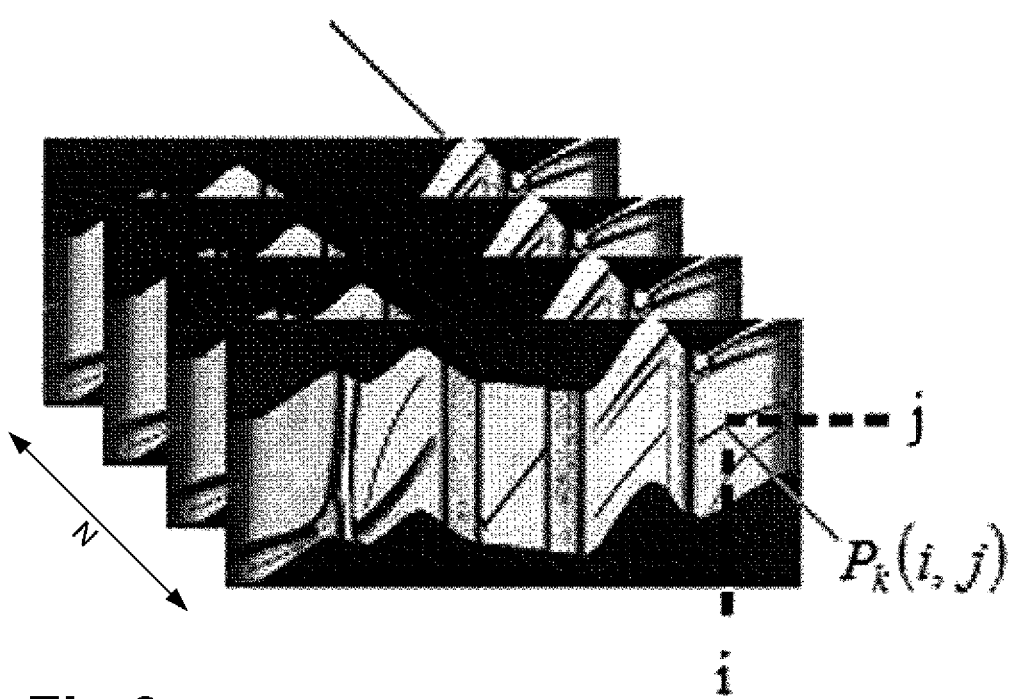
FIG. 3 represents the basic patterns of one and the same type obtained after the searching and positioning step.

Again taking the case of the crown zone, FIG. 3 shows a set of N basic patterns of a tread of one and the same type.

In the image k of a basic pattern of this set, the pixel with coordinates i, j is marked $P_k(i, j)$. Associated with this pixel, as has been said above, are the values at the point with coordinates i, j, of the physical magnitudes measured by the sensor.

A reference image is obtained for each of these magnitudes and for the point with coordinates i, j, marked $P_{Moy}(i, j)$, by calculating the mean of the values of these magnitudes associated with the pixels $P_k(i, j)$ and originating from the N images forming the collection of images.

This reference corresponds to the calculated representation of the "ideal" reference surface, without fail, the acquisition of which has been carried out in the same conditions or in conditions very similar to those of the acquired image that it is desired to analyze.

In order to prevent the influence of extreme values, caused for example by the presence on one of the images of the collection of a localized anomaly, it is also possible to calculate the median value rather than the mean value. This calculation mode makes it possible to reduce the influence of a fault when the collection of images comprises a reduced number of images, such as for example the basic pattern comprising the tread-wear indicators. The result of this is a reduction in the evaluation anomalies when, subsequently, each pattern is compared with the reference pattern.

For example, the median value of the gray level of all the pixels $P_k(i, j)$ of the images of the collection with coordinates (i, j) will be calculated to obtain the value of gray level of the pixel with coordinate (i, j) of the reference image and marked $P_{Med}(i, j)$; or the mean value of brightness of all the pixels $P_k(i, j)$ with coordinate (i, j) in order to obtain the brightness value of the pixel with coordinate (i, j) of the reference image.

Also, it may be worthwhile in this step to associate with each of the magnitudes and for each point with coordinate (i, j) of the reference image other calculated values, of a statistical nature, such as threshold values, standard deviation values, mean median values, mean deviations relative to the median value, etc., which will be useful for the interpretation of the deviations during the subsequent evaluation phase.

This gives, for one and the same basic pattern of the tread or for one and the same sidewall, as many reference images as calculated magnitudes. The reference image is then materialized in the form of a set of data tables corresponding, for each of the physical magnitudes, or for each of the statistical magnitudes associated with these magnitudes, to the calculated value of these physical or statistical magnitudes for each point with coordinates i, j.

The next phase of the evaluation method consists in comparing each new image of a basic pattern or of a sidewall with the reference image obtained in the conditions described above.

The comparison method can be based on a simple analysis at each point with coordinate i, j and for a given physical magnitude of the variations between the value measured on the image to be evaluated of this physical magnitude and the reference value of this magnitude obtained according to the method described above. When this variation is greater than a predetermined threshold, this pixel will be declared as an anomaly. If the adjacent pixels are also declared abnormal, the zone in question will be identified and the basic pattern, or the tire sidewall, on which the anomaly has been detected will itself be declared as an anomaly so as to orient the action of evaluation of the tire.

A collection of images is formed by a sufficient number N of images, typically of 10 or 15 images, of the zones concerned, acquired on one and the same tread, or on 10 or 15 tires examined previously. But it may also be advantageous to orient the choice of the images forming the reference collection by eliminating for example a zone or the images of tires in which an anomaly has been detected, or any other arrangement capable of reducing the influence of the anomalies and of the significant deviations relative to a value considered to be normal.

It is also possible to calculate a sliding reference image by using the collection of images originating from the last N tires previously examined, so as to set aside the slow evolutions associated for example with the aging of the mold. It is also possible to keep in memory reference images calculated at determined periods in order to assess these slow evolutions.

On reading the foregoing, the application of the method for calculating the reference makes it possible to flexibly adapt the reference used as a basis for the evaluation of the visual surface anomalies that can be seen on the tires after the curing step, and to dispense with the calculation steps necessary when the reference originates from a theoretical model, sometimes very far from the real tire as it appears visually on the production floor.

The invention claimed is:

1. A method for evaluating the surfaces of a tire, said surfaces being molded with rigid elements, comprising the steps of:
   a collection of N images of a given zone of the tire is constituted based on the images originating from one or more tires, each of the images of the collection being constituted by the values of physical magnitudes measured by a sensor sensitive to the reflection of the light at each of the points with coordinates i, j of said surface;

the images of said collection are made to correspond by superposition;

the image of the zone of a tire from said collection to be evaluated is compared with a reference image; and wherein the value of the physical magnitudes of the reference image is calculated based on the value of each of these physical magnitudes measured on the N images of said collection.

2. The evaluation method as claimed in claim 1, wherein the sensor is capable of providing digital information of the value of the physical magnitudes measured.

3. The evaluation method as claimed in claim 1, wherein the placing in correspondence by superposition of the images is carried out by calculating the correlation between each of the images of the collection by sliding the images over one another.

4. The evaluation method as claimed in claim 3, wherein, during the step of placing the images in correspondence by superposition, characteristic elements of the image are determined and the image is deformed in order to place these characteristic elements in correspondence.

5. The evaluation method as claimed in claim 1, wherein the physical magnitudes measured comprise the height relative to a reference surface, the brightness, the texture, the gray level or the color.

6. The evaluation method as claimed in claim 1, wherein, for each of the physical magnitudes measured, the value of a physical magnitude at a point i, j of the reference image is formed by the calculation of one or more statistical values obtained based on the N values of this physical magnitude measured at the point with coordinates i, j of each of the images of said collection of images.

7. The evaluation method as claimed in claim 6, wherein the statistical values comprise the calculation of the mean value, of the median value, of the standard deviation, of the mean of the medians.

8. The evaluation method as claimed claim 1, wherein the surface to be evaluated consists of the surface of the sidewall, of the shoulder or of the bottom zone of the tire, and wherein the collection of images used for calculating the reference image consists of the set of images of these same zones extracted from the images of N previous tires.

9. The evaluation method as claimed in claim 1, wherein the surface to be evaluated consists of the tread of a tire, said tread being formed by the repetition of a restricted number of types of basic patterns, juxtaposed circumferentially in a given sequence and wherein the collection of images used for calculating the reference image of a given basic pattern consists of the set of images of this basic pattern extracted from the image of the tread of this tire.

10. The evaluation method as claimed in claim 9, wherein the sequence of the basic patterns of the image of the tread to be evaluated is determined and this sequence is compared with the known basic sequence.

* * * * *